(12) United States Patent
Takahashi

(10) Patent No.: US 6,789,158 B2
(45) Date of Patent: Sep. 7, 2004

(54) METHOD OF REWRITING PROGRAM IN A FLASH MICROCOMPUTER

(75) Inventor: Shuji Takahashi, Kanagawa (JP)

(73) Assignee: NEC Electronics Corporation, Kanagawa (JP)

(*) Notice: Subject to any disclaimer, the term of this patent is extended or adjusted under 35 U.S.C. 154(b) by 76 days.

(21) Appl. No.: 09/770,459

(22) Filed: Jan. 29, 2001

(65) Prior Publication Data

US 2002/0002652 A1 Jan. 3, 2002

(30) Foreign Application Priority Data

Jan. 28, 2000 (JP) ........................................ 2000-019997

(51) Int. Cl.$^7$ .............................................. G06F 12/00
(52) U.S. Cl. .......................................... 711/103; 713/2
(58) Field of Search ............................... 711/103, 163, 711/166, 170; 713/1, 2, 100; 365/185.29, 185.3, 185.33

(56) References Cited

U.S. PATENT DOCUMENTS

| | | | | |
|---|---|---|---|---|
| 5,568,641 A | * | 10/1996 | Nelson et al. ................... | 713/2 |
| 5,579,522 A | * | 11/1996 | Christeson et al. ............. | 713/2 |
| 6,079,016 A | * | 6/2000 | Park ............................... | 713/2 |
| 6,205,548 B1 | * | 3/2001 | Hasbun .......................... | 713/2 |
| 6,275,931 B1 | * | 8/2001 | Narayanaswamy et al. ..... | 711/4 |
| 6,308,265 B1 | * | 10/2001 | Miller ............................ | 713/2 |
| 6,330,634 B1 | * | 12/2001 | Fuse et al. ..................... | 711/103 |
| 2002/0178352 A1 | * | 11/2002 | Lambino et al. ................ | 713/2 |

FOREIGN PATENT DOCUMENTS

| | | |
|---|---|---|
| EP | 1 120 709 A2 * | 8/2001 |
| JP | 6-266552 | 9/1994 |
| JP | 8-69376 | 3/1996 |
| JP | 8-227359 | 9/1996 |
| JP | 8-255084 | 10/1996 |
| JP | 8-280679 | 10/1996 |
| JP | A 10-97427 | 4/1998 |
| JP | 10-177527 | 6/1998 |
| JP | 11-96779 | 4/1999 |
| JP | 11-175330 | 7/1999 |
| JP | 11-316687 | 11/1999 |

* cited by examiner

Primary Examiner—Pierre Bataille
(74) Attorney, Agent, or Firm—Young & Thompson

(57) ABSTRACT

A method of rewriting a boot program into a memory device including at least first and second memory blocks to which a boot program can be electrically written and from which a boot program can be electrically erased, includes the steps of (a) erasing data stored in the second memory block to which a new boot program is to be written, (b) writing a new boot program into the second memory block, (c) changing an address of the second memory block such that the second memory block can be recognized as the new primary boot block, (d) erasing an existing boot program from the first memory block, and leaving the second memory block as the primary boot block until a further new boot program is written into the memory device.

12 Claims, 13 Drawing Sheets

METHOD OF REWRITING PROGRAM IN A FLASH MICROCOMPUTER

BACKGROUND OF THE INVENTION

1. Field of the Invention

The invention relates to a method of rewriting a boot program stored in a memory device into a new boot program, an apparatus of doing the same, and a recording medium storing a program therein for causing a computer to carry out the method or to act as the apparatus.

2. Description of the Related Art

There have been suggested a lot of methods of rewriting a program in a memory device, in particular, in a flash memory device.

For instance, Japanese Unexamined Patent Publication No. 11-96779 has suggested a method of rewriting a program in a flash memory device which method is capable of reducing the number of rewriting a program.

In the method, a header area and a program data area are arranged in each of blocks in a physical address associated with a flash memory device, and header areas and program data areas of the blocks are arranged in series in a logic address associated with a processor. When data stored in a program data area N is to be rewritten, it is usually necessary to rewrite a block in the program data area N and a block in the associated header area. However, the program data area N and the associated header area are located in the same block in the physical address of the flash memory device. Accordingly, only the block is rewritten.

Japanese Unexamined Patent Publication No. 11-316687, which is based on U.S. patent application Ser. No. 019178 filed on Feb. 5, 1999 and assigned to Compaq Computer Corporation, has suggested an apparatus for compensating for system error occurring while the system is in a start-up process.

The suggested apparatus is comprised of a read only memory (ROM), a non-volatile random access memory (RAM), and a central processing unit (CPU). The read only memory stores a plurality of bootable flash images, and includes a non-programmable boot block. The non-volatile random access memory stores status data indicative of which flash image was selected. The central processing unit tests as to whether the selected flash image is perfect. If perfect, the central processing unit carries out the selected flash image, and if not, the central processing unit newly selects another flash image. The central processing unit tests as to whether the thus newly selected flash image is perfect, and carries out the selected flash image only when it is perfect. In accordance with the apparatus, since an imperfect flash image is not carried out, it would be possible to automatically recover the system.

Japanese Unexamined Patent Publication No. 6-266552, which is based on U.S. patent application Ser. No. 695952 filed on May 6, 1992 and assigned to Intel Corporation, has suggested a computer system which is capable of dynamically modifying or updating a part of code or data stored in a non-volatile memory device, without detaching any parts such as a cover from the computer system.

Specifically, the computer system is comprised of a processor carrying out a process logic, a non-volatile memory device coupled to the processor and storing data and operating system process logic therein, means coupled to the processor for reading out what is stored in the non-volatile memory device, means coupled to the processor for erasing what is stored in the non-volatile memory device, means coupled to the processor for programming the non-volatile memory device, and means for updating operating system process logic which the operating system process logic is being carried out.

Japanese Unexamined Patent Publication No. 10-177527 has suggested a method of updating data in a flash memory which method avoids data from being erased or from being changed into different data, even if power supply is stopped during data is being updated.

Specifically, the method updates data stored in a flash memory from which data can be erased block by block, and into which data can be written byte by byte. In the method, a flash memory is divided into two blocks. A unit of data is alternately written into the two blocks. When data is to be read out of the two blocks, a latest data unit among data units properly written into the blocks is read out.

Japanese Unexamined Patent Publication No. 8-280679 has suggested a program memory device in which a program can be readily rewritten.

The program memory device is comprised of a flash memory storing various programs and including a plurality of areas into which data can be electrically written and from which data can be electrically erased, a connector arranged externally of the program memory device operating in accordance with a program, and electrically connecting the program memory device to a memory storing a new program to be newly stored into the program memory device, first means for selecting one of a program of the flash memory and the new program stored in the memory, second means for storing the new program into a non-used area in the flash memory, and assigning an executable address to the new program, and a primary memory storing data used for converting the address to be carried out in the second means, into an address of a program stored in the flash memory, data about a degree to which the flash memory is used, and data about a total number of rewriting the flash memory.

If electric power supply to a computer is stopped for some reasons while a boot program stored in the computer is being written, it would be impossible to restart the boot program.

Japanese Unexamined Patent Publication No. 8-255084, which is based on U.S. patent application Ser. No. 375,095 filed on Jan. 18, 1995 and assigned to Hewlett Packard Company, has suggested a method for preventing such a trouble.

FIGS. 1 and 2 are flow charts of the method suggested in Japanese Unexamined Patent Publication No. 8-255084.

Hereinbelow is explained the method in the assumption that a boot program stored in a primary boot block 0 is to be written into a new boot program.

As illustrated in FIG. 2-(A), in an initial state, a boot program is stored in a primary boot block 0, and data is stored in a substitution block 1.

First, as illustrated in FIG. 2-(B), data stored in the substitution block 1 is erased in step 300.

Then, as illustrated in FIG. 2-(C), a boot program stored in the primary boot block 0 is copied into the substitution block 1 in step 310.

Then, a non-volatile memory block circuit (not illustrated) changes an address of the substitution block 1 to such an address that the substitution block 1 can be recognized as a boot block, in step 320.

Then, as illustrated in FIG. 2-(D), a boot program stored in the primary boot block 0 is erased in step 330.

Then, as illustrated in FIG. 2-(E), a new boot program is written into the primary boot block 0 in step 340.

Then, the above-mentioned non-volatile memory block circuit (not illustrated) changes an address of the primary boot block 0 to such an address that the primary boot block 0 into which a new boot program has been stored can be recognized as a boot block, in step 350.

Then, as illustrated in FIG. 2-(F), the boot program which has been copied from the primary boot block 0 is erased from the substitution block 1, in step 360.

Thus, the substitution block 1 which is now empty can be used as an area for storing data therein. Hence, as illustrated in FIG. 2-(G), data is stored into the substitution block 1.

If a boot program has been properly rewritten in the primary boot block 0, the primary boot block 0 absolutely becomes a boot area, as illustrated in FIG. 2-(F). Accordingly, judgment as to whether a boot program has been properly rewritten is made by detecting whether the primary boot block 0 becomes a boot area. Hence, in the conventional method, a boot program has to be copied to the substitution block 1 from the primary boot block 0, as having been explained above, resulting in that extra stress is exerted on a flash memory of the substitution block 1.

In addition, in the conventional method having been explained with reference to FIGS. 1 and 2, it is necessary to copy a boot program stored in the primary boot block 0 into the substitution block 1, and carry out an erasion/writing operation twice to the substitution block 1 in order to erase the boot program copied into the substitution block 1 and use the substitution block 1 as an area for storing data therein.

Specifically, the first rewriting is carried out when the status illustrated in FIG. 2-(B) is transferred to the status illustrated in FIG. 2-(C), and the second rewriting is carried out when the status illustrated in FIG. 2-(F) is transferred to the status illustrated in FIG. 2-(G).

The method or apparatus suggested in the above-mentioned Japanese Unexamined Patent Publications Nos. 11-96779, 11-316687, 6-266552, 10-177527 and 8-280679 has the step of copying a program to a memory block acting as a substitution block, resulting in exertion of extra stress on a flash memory of a memory block acting as a substitution block.

SUMMARY OF THE INVENTION

In view of the above-mentioned problems in the conventional methods and apparatuses, it is an object of the present invention to provide a method of rewriting a boot program which method makes it no longer necessary to copy a boot program from a memory block to another memory block when a boot program stored in a memory device is to be rewritten.

It is also an object of the present invention to provide a computer which is capable of doing the same.

In one aspect of the present invention, there is provided a method of rewriting a boot program in a memory device including at least first and second memory blocks to which a boot program can be electrically written and from which a boot program can be electrically erased, the method including the steps of (a) erasing data stored in the first memory block to which a new boot program is to be written, (b) writing a new boot program into the first memory block, (c) changing an address of the first memory block such that the first memory block can be recognized as a boot block, and (d) erasing a boot program out of the second memory block.

In accordance with the above-mentioned method, it is no longer necessary to copy a boot program stored in a memory block (the second memory block) into another memory block acting as a substitution block (the first memory block), unlike the above-mentioned conventional method, and it is possible to write a new boot program directly into the first memory block acting as a substitution block. Hence, an erasion/writing operation of a boot program to the first memory block acting as a substitution block is carried out only once, whereas the same operation had to be carried out twice in the conventional method. The method makes it possible to reduce the number of erasion/writing of a boot program to the first memory block acting as a substitution block, ensuring reduction in stress to be exerted on a flash memory of the first memory block, and hence, lengthening a lifetime of the flash memory.

It is preferable that the method further includes the step of writing data about the new boot program into a storage area associated with the first memory block.

This additional step ensures the first memory block to be recognized as a boot block area.

It is preferable that the method further includes the step of judging that a boot program was not properly rewritten, if a boot program is stored in both the first and second memory blocks.

It is preferable that the method further includes the step of judging that a boot program was not properly rewritten, if data about the new boot program is stored in storage areas associated with both the first and second memory blocks.

It is preferable that the memory device includes three or more memory blocks, and two memory blocks among the memory blocks are used.

The method in accordance with the present invention can be applied to a memory device including three or more memory blocks as well as a memory device including two memory blocks. As the memory device includes the greater number of memory blocks, the memory device could have a longer lifetime.

There may be selected a flash memory or a read only memory (ROM) as the memory device.

In another aspect of the present invention, there is provided a computer including (a) a memory device including at least two memory blocks, (b) a controller which controls writing a boot program into the memory blocks and erasing a boot program from the memory blocks, and (c) an address changer which changes an address of the memory blocks, the controller erasing data stored in a first memory block among the memory blocks, writing a new boot program into the first memory block, and erasing a boot program stored in a second memory block among the memory blocks, the address changer changing an address of the first memory block such that the first memory block can be recognized as a boot block.

In accordance with the above-mentioned computer, it is no longer necessary to copy a boot program stored in a memory block (the second memory block) into another memory block acting as a substitution block (the first memory block), unlike the above-mentioned conventional apparatus, and it is possible to write a new boot program directly into the first memory block acting as a substitution block. Hence, an erasion/writing operation of a boot program to the first memory block acting as a substitution block is carried out only once, whereas the same operation had to be carried out twice in the conventional apparatus. The computer makes it possible to reduce the number of erasion/writing of a boot program to the first memory block acting as a substitution block, ensuring reduction in stress to be exerted on a flash memory of the first memory block, and hence, lengthening a lifetime of the flash memory.

It is preferable that the controller writes data about the new boot program into a storage area associated with the first memory block.

The controller ensures that the first memory block is recognized as a boot block area.

It is preferable that the controller judges that a boot program was not properly rewritten, if a boot program is stored in both the first and second memory blocks.

It is preferable that the controller judges that a boot program was not properly rewritten, if data about the new boot program is stored in storage areas associated with both the first and second memory blocks.

There may be selected a flash memory or a read only memory (ROM) as the memory device.

In still another aspect of the present invention, there is provided a recording medium readable by a computer, storing a program therein for causing a computer to carry out the above-mentioned method of rewriting a boot program in a memory device.

There is further provided a recording medium readable by a computer, storing a program therein for causing a computer to act as the above-mentioned computer.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 3:
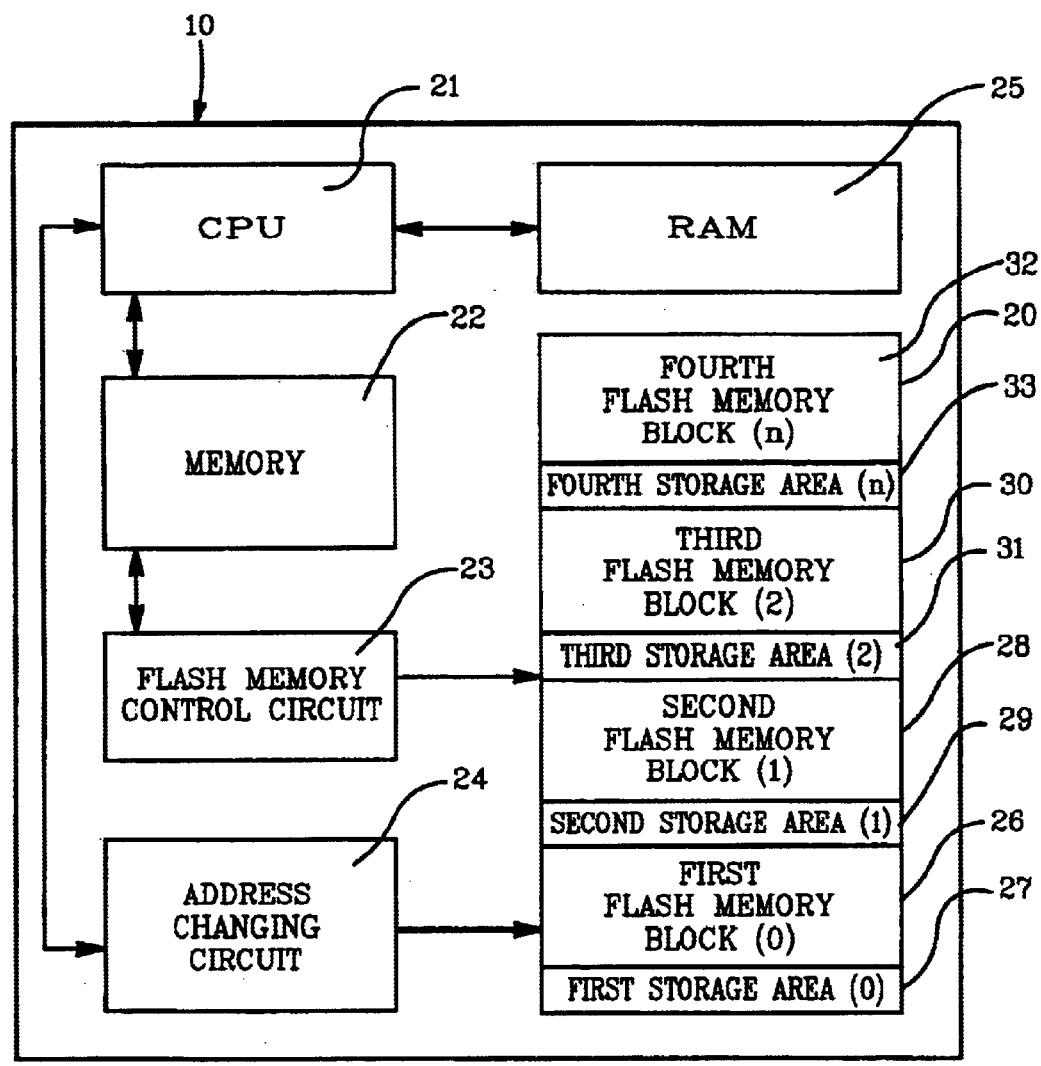
FIG. 3 is a block diagram of a flash microcomputer in which a method of rewriting a program in accordance with a preferred embodiment of the present invention is reduced into practice.

FIG. 3 is a block diagram of a flash microcomputer in which a method of rewriting a program in accordance with an embodiment of the present invention is reduced into practice.

A flash microcomputer in accordance with the embodiment includes a flash memory 20.

The flash memory 20 includes a first flash memory block (0) 26, a second flash memory block (1) 28, a third flash memory block (2) 30, and a fourth flash memory block (n) 32. A boot program can be electrically written into the first to fourth flash memory blocks 26 to 32, and a boot program can be erased from the first to fourth flash memory blocks 26 to 32.

The flash memory 20 further includes a first storage area (0) 27 associated with the first flash memory block (0) 26, a second storage area (1) 29 associated with the second flash memory block (1) 28, a third storage area (2) 31 associated with the third flash memory block (2) 30, and a fourth storage area (n) 33 associated with the fourth flash memory block (n) 32. The first to fourth storage areas 27 to 33 store data about a boot program stored in the associated flash memory block 26 to 32.

The flash microcomputer 10 further includes a memory 22 storing a program used for controlling writing a boot program into the flash memory 20 and erasing a boot program from the flash memory 20, a flash memory control circuit 23 which carried out writing a boot program into the flash memory 20 and erasing a boot program from the flash memory 20 in accordance with the program stored in the memory 22, an address changing circuit 24 which changes addresses of the first to fourth flash memory blocks (0) 26 to (n) 32, a random access memory (RAM) 25, and a central processing unit (CPU) 21 which controls the random access memory 25 and the address changing circuit 24 in accordance with the program stored in the memory 22.

Figure 4:
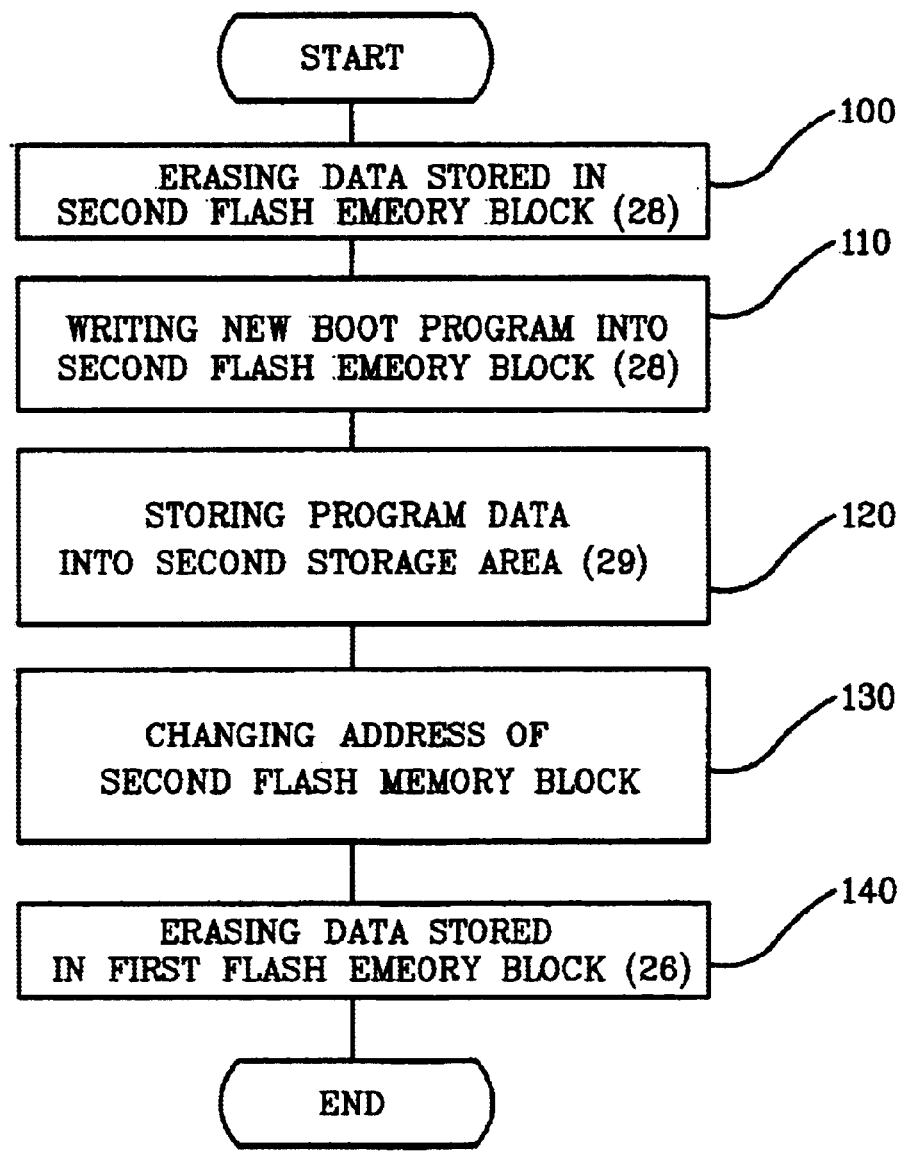
FIG. 4 is a flow chart showing an operation of the flash microcomputer illustrated in FIG. 3.
Figure 5:
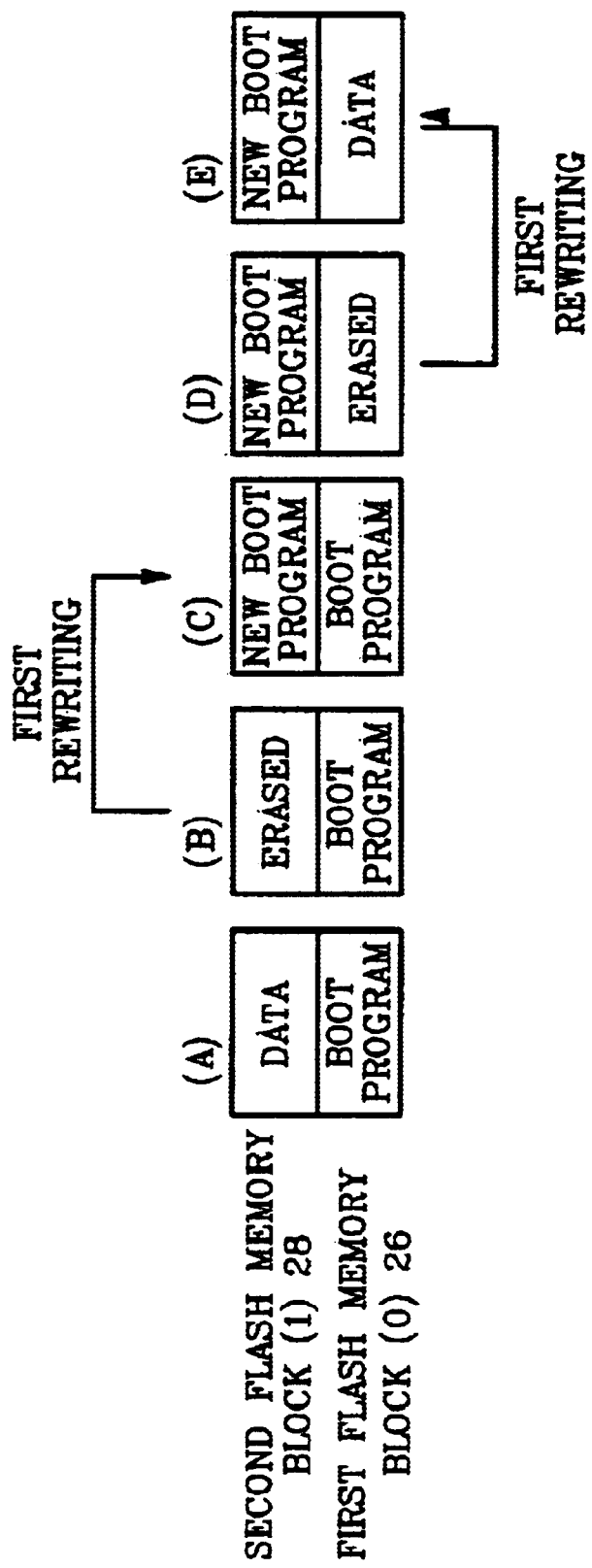
FIG. 5 is a flow chart showing how two memory blocks are rewritten in a flash memory constituting a part of the flash microcomputer illustrated in FIG. 3.

FIGS. 4 and 5 are flow charts showing an operation of the flash microcomputer 10 illustrated in FIG. 3. Hereinbelow is explained an operation of the flash microcomputer 10 with reference to FIGS. 4 and 5.

It is assumed in the present embodiment that the second flash memory block (1) 28 is used as a substitution block into which a new boot program is to be written, and a boot program stored in the first flash memory block (0) 26 is rewritten into a new boot program.

Before rewriting a boot program, as illustrated in FIG. 5-(A), the first flash memory block (0) 26 stores a boot program therein, and the second flash memory block (1) 28 stores data therein.

First, as illustrated in FIG. 5-(B), data is erased from the second flash memory block (1) 28 acting as a substitution block into which a new boot program is to be written, in step 100.

Figure 6:
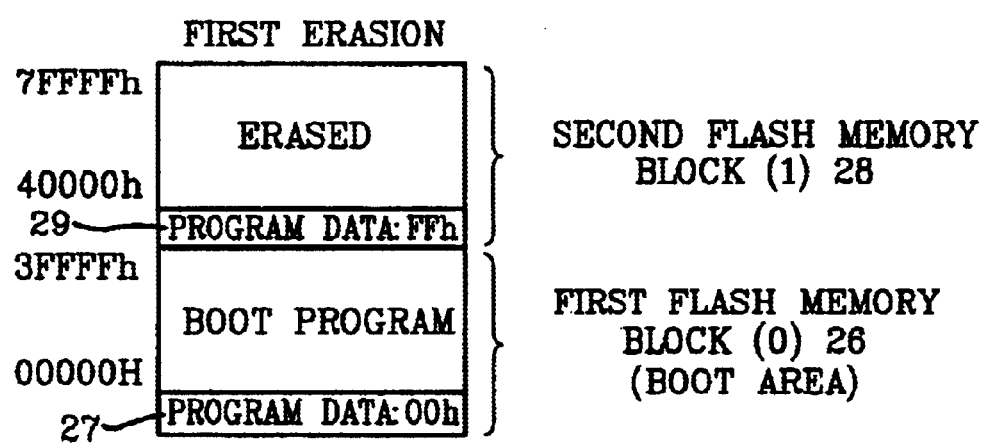
FIG. 6 is a block diagram showing status of the first and second flash memory blocks while a program is being rewritten.

FIG. 6 illustrates status of both the first flash memory block (0) 26 and the second flash memory block (1) 28 at this stage. The first flash memory block (0) 26 still stores a boot program therein, and the second flash memory block (1) 28 is empty.

The first storage area (0) 27 associated with the first flash memory block (0) 26 stores program data 00h indicating that a boot program is stored in an associated flash memory block, and the second storage area (1) 29 associated with the second flash memory block (1) 28 stores program data FFh indicating that an associated flash memory block stores nothing, that is, an associated flash memory block is empty.

Then, as illustrated in FIG. 5-(C), a new boot program is written into the second flash memory block (1) 28 acting as a substitution block, in step 110.

Figure 7:
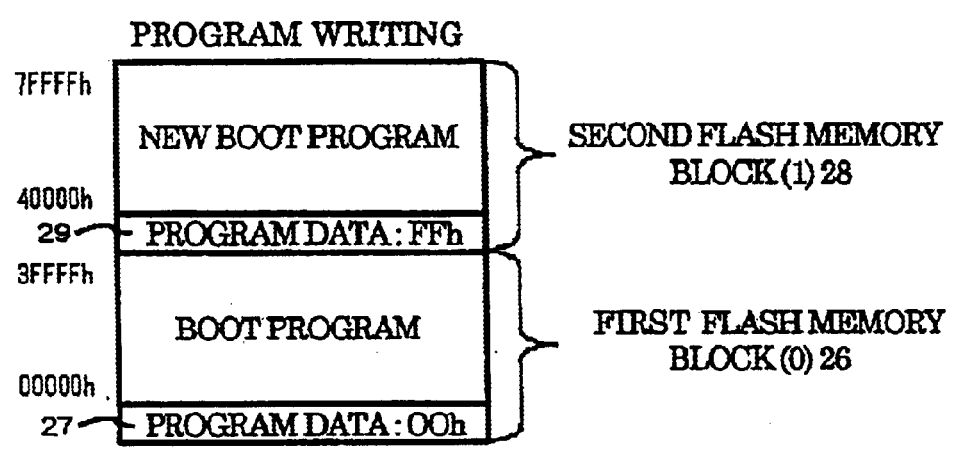
FIG. 7 is a block diagram showing status of the first and second flash memory blocks while a program is being rewritten.

FIG. 7 illustrates status of both the first flash memory block (0) 26 and the second flash memory block (1) 28 at this stage. The first flash memory block (0) 26 still stores a boot program therein, and the second flash memory block (1) 28 stores the new boot program.

The first storage area (0) 27 associated with the first flash memory block (0) 26 stores program data 00h indicating that a boot program is stored in an associated flash memory block, and the second storage area (1) 29 associated with the second flash memory block (1) 28 still stores program data FFh indicating that an associated flash memory block stores nothing.

Then, new program data is stored into the second storage area (1) 29 associated with the second flash memory block (1) 28 into which the new boot program has been written, in step 120.

Figure 8:
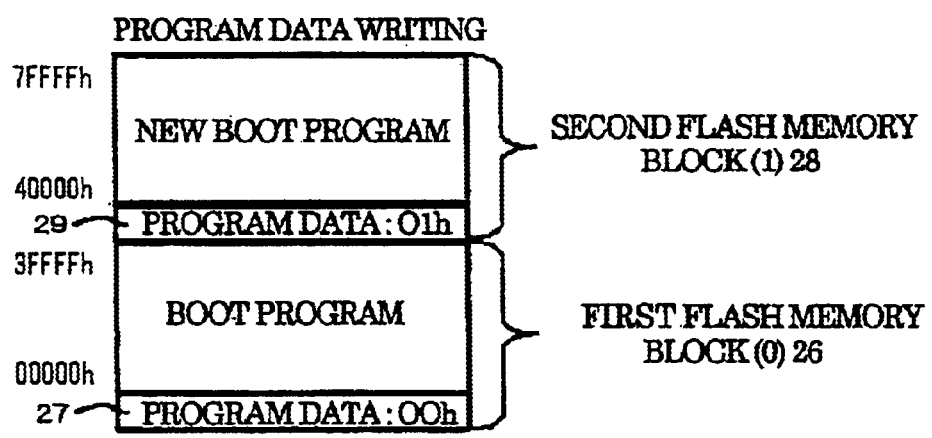
FIG. 8 is a block diagram showing status of the first and second flash memory blocks while a program is being rewritten.

FIG. 8 illustrates status of both the first flash memory block (0) 26 and the second flash memory block (1) 28 at this stage. The first flash memory block (0) 26 still stores a boot program therein, and the second flash memory block (1) 28 stores the new boot program.

The first storage area (0) 27 associated with the first flash memory block (0) 26 stores program data 00h indicating that a boot program is stored in an associated flash memory block, and the second storage area (1) 29 associated with the second flash memory block (1) 28 stores program data 01h indicating that an associated flash memory block stores another boot program.

Then, the central processing unit 21 causes the address changing circuit 24 to change an address of the second flash memory block (1) 28 such that the second flash memory block (1) 28 into which the new boot program has been written can be recognized as a boot block, in step 130.

Figure 9:
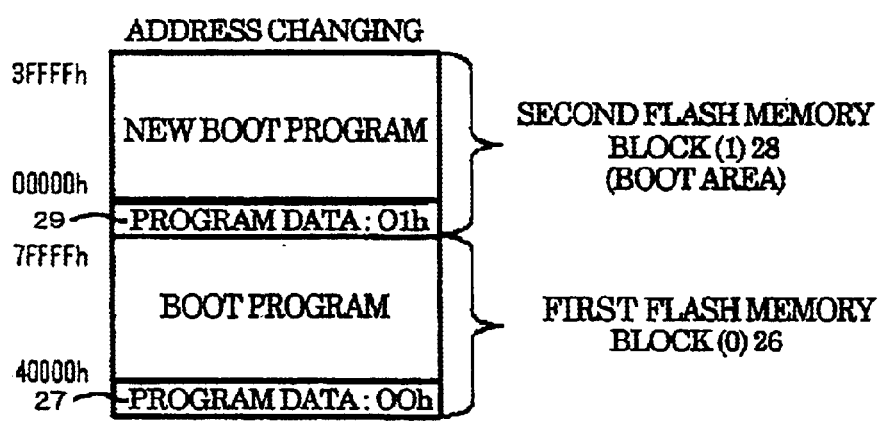
FIG. 9 is a block diagram showing status of the first and second flash memory blocks while a program is being rewritten.

FIG. 9 illustrates status of both the first flash memory block (0) 26 and the second flash memory block (1) 28 at this stage. Similarly to FIG. 8, the first flash memory block (0) 26 still stores a boot program therein, and the second flash memory block (1) 28 stores the new boot program.

However, in the status illustrated in FIG. 9, an address of the second flash memory block (1) 28 into which the new boot program has been written is changed to "00000h-3FFFFh" from "40000h-7FFFFh", unlike an address of the second flash memory block (1) 28 in the status illustrated in FIG. 8. By changing the address, the second flash memory block (1) 28 into which the new boot program has been written is recognized as a boot block by the central processing unit 21.

In contrast, an address of the first flash memory block (0) 26 still storing the old boot program is changed to "40000h-7FFFFh" from "00000h-3FFFFh". By changing the address, the first flash memory block (0) 26 is not recognized as a boot block by the central processing unit 21.

Then, as illustrated in FIG. 5-(D), the boot program stored in the first flash memory block (0) 26 is erased, in step 140.

Figure 10:
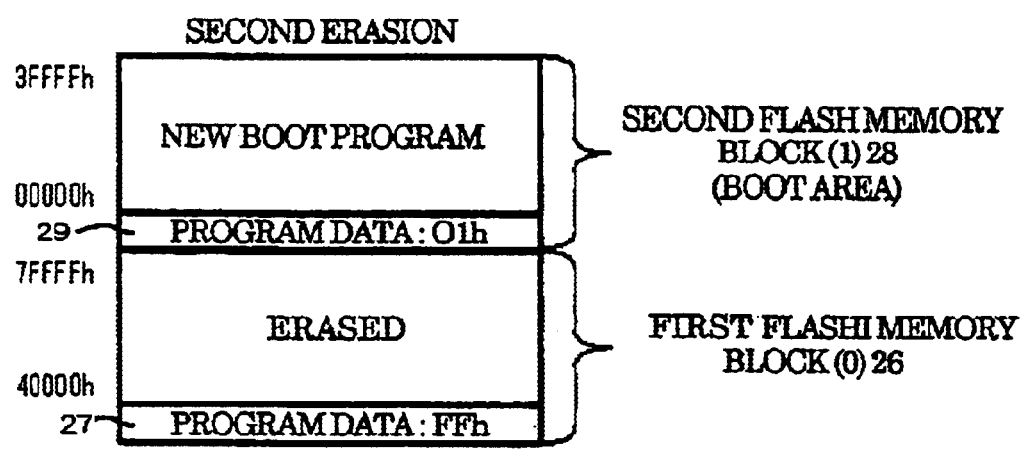
FIG. 10 is a block diagram showing status of the first and second flash memory blocks while a program is being rewritten.

FIG. 10 illustrates status of both the first flash memory block (0) 26 and the second flash memory block (1) 28 at this stage. The first flash memory block (0) 26 is empty, and the second flash memory block (1) 28 stores the new boot program.

The first storage area (0) 27 associated with the first flash memory block (0) 26 stores program data FFh indicating that an associated flash memory block stores nothing, and the second storage area (1) 29 associated with the second flash memory block (1) 28 stores program data 01h indicating that an associated flash memory block stores a boot program.

Then, as illustrated in FIG. 5-(E), data is stored into the empty first flash memory block (0) 26.

Thus, the operation of rewriting a boot program in the flash microcomputer 10 is completed.

Herein, it is assumed that electric power supply is stopped in the status illustrated in FIG. 8, that is, when the first flash memory block (0) 26 stores an old boot program, and a new boot program is being written into the second flash memory block (1) 28.

Accordingly, when the flash microcomputer 10 restarts, the flash microcomputer 10 includes two boot programs. That is, both the first storage area (0) 27 and the second storage area (1) 29 store program data indicating that a boot program is stored in an associated flash memory block. Based on such program data stored in both the first storage area (0) 27 and the second storage area (1) 29, it is judged that a program rewriting operation has not been properly completed. Thus, the flash microcomputer 10 can judge that it is necessary to make recovery.

Figure 11:
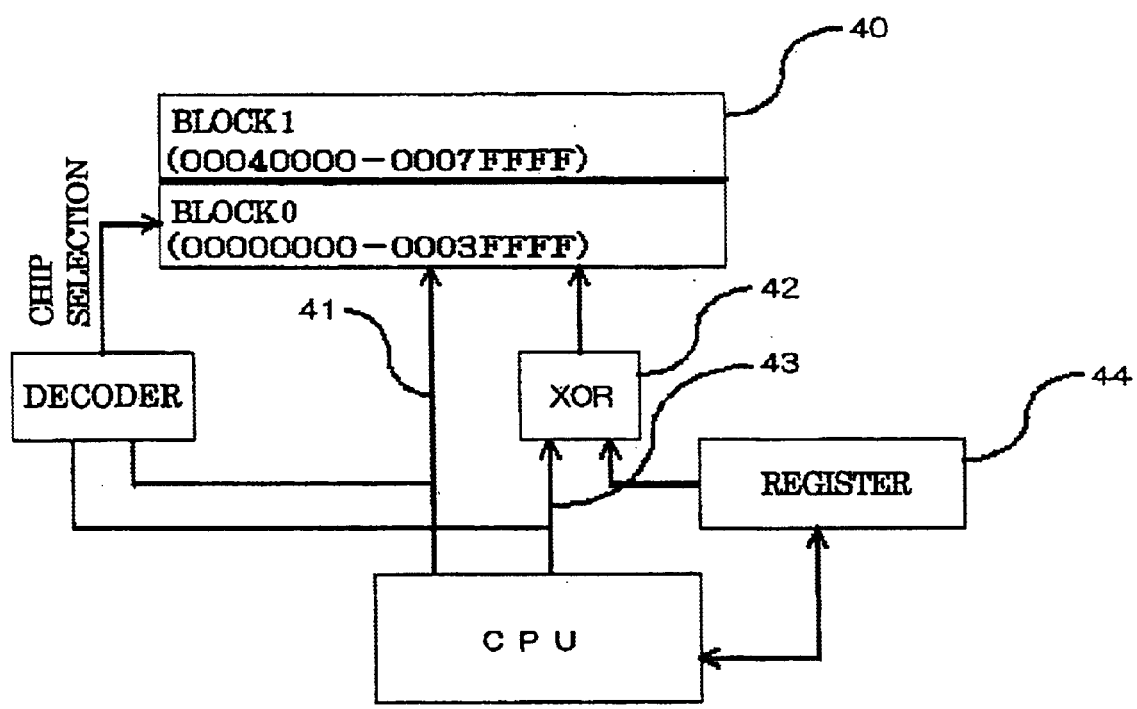
FIG. 11 is a block diagram of an example of a circuit for changing an address, in the flash microcomputer illustrated in FIG. 3.
Figure 12:
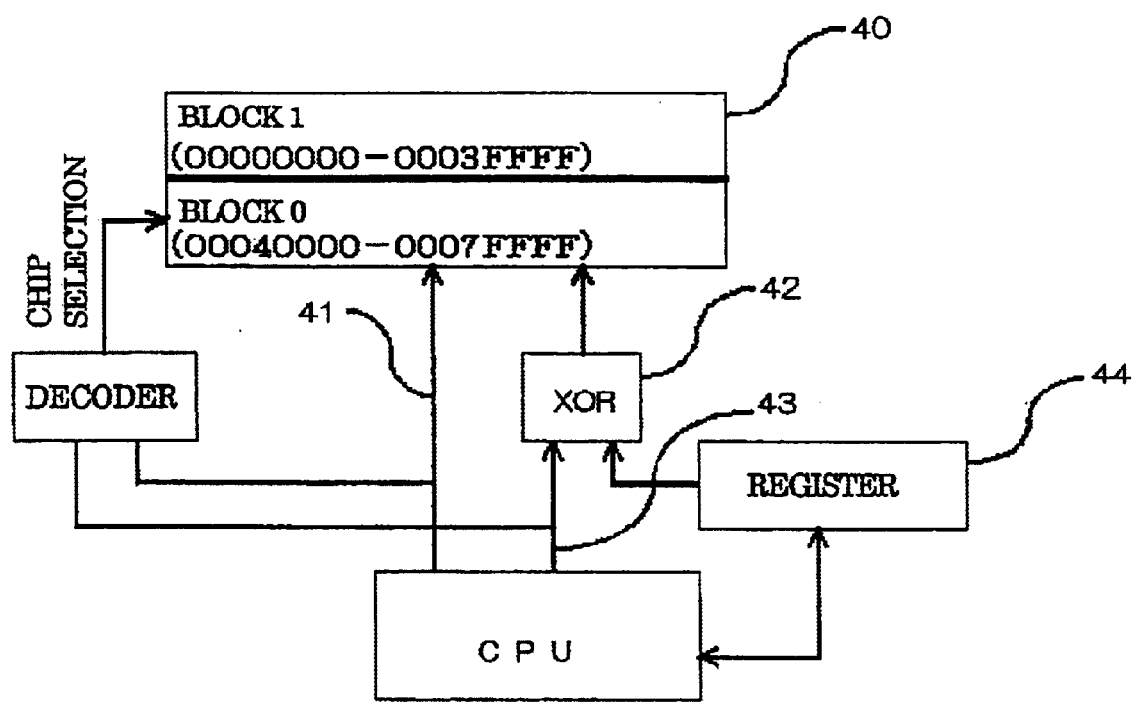
FIG. 12 is a block diagram of another example of a circuit for changing an address, in the flash microcomputer illustrated in FIG. 3.

FIGS. 11 and 12 illustrate examples of systems in which a boot block memory address is changed by the address changing circuit 24.

In the system illustrated in FIG. 11, an ordinary memory address is indicated in order to boot the first flash memory block (0) 26 at first. In the system illustrated in FIG. 12, a memory address is indicated in order to boot the second flash memory block (1) 28 at first.

A register 44 for designating a boot block can be set or reset bit by bit.

FIG. 11 illustrates a status in which the register 44 is in a reset condition. An input to XOR gate 42 is determined such that an upper address bit line 43 is not inverted. A lower address bit line 41 designates a memory 40 in a conventional manner.

FIG. 12 illustrates a status in which the register 44 is in a set condition. An input to XOR gate 42 is determined such that the upper address bit line 43 is inverted. Accordingly, the second flash memory block (1) 28 is recognized as a boot block.

Figure 1:
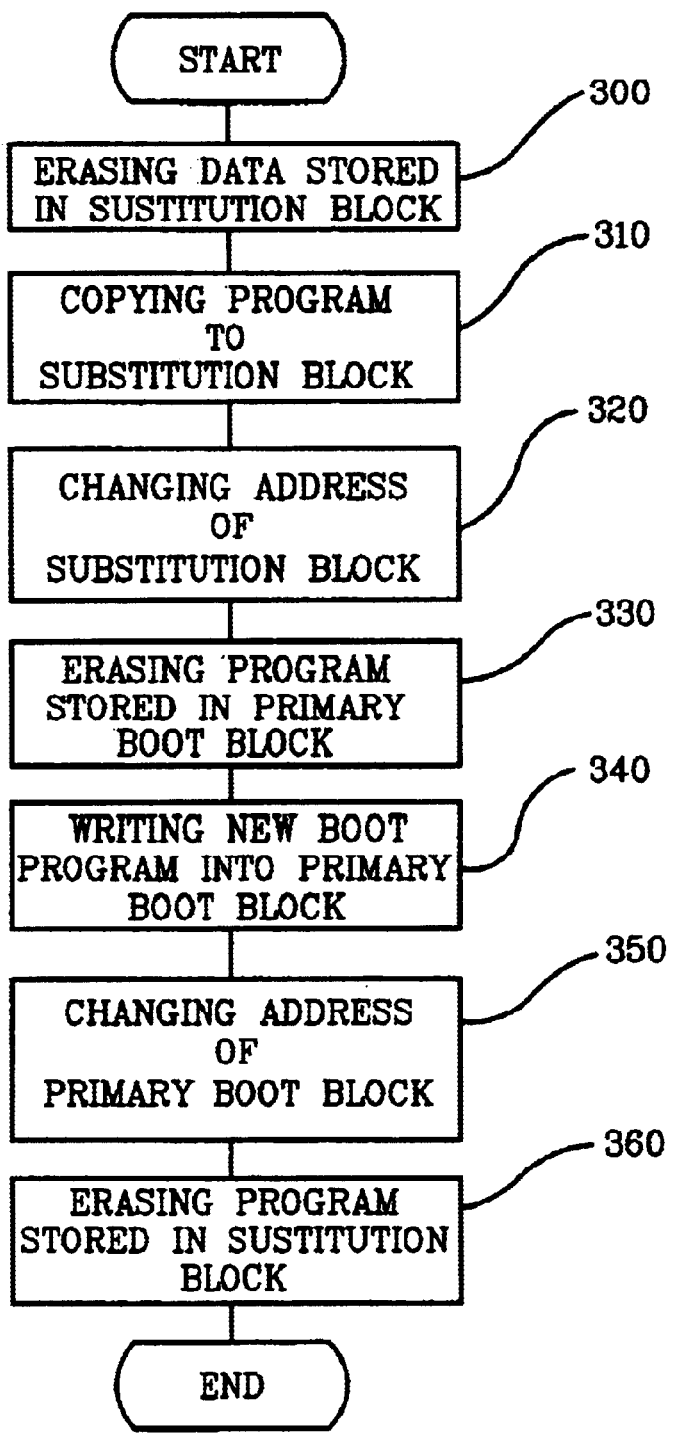
FIG. 1 is a flow chart showing respective steps of a conventional method of rewriting a program.
Figure 2:
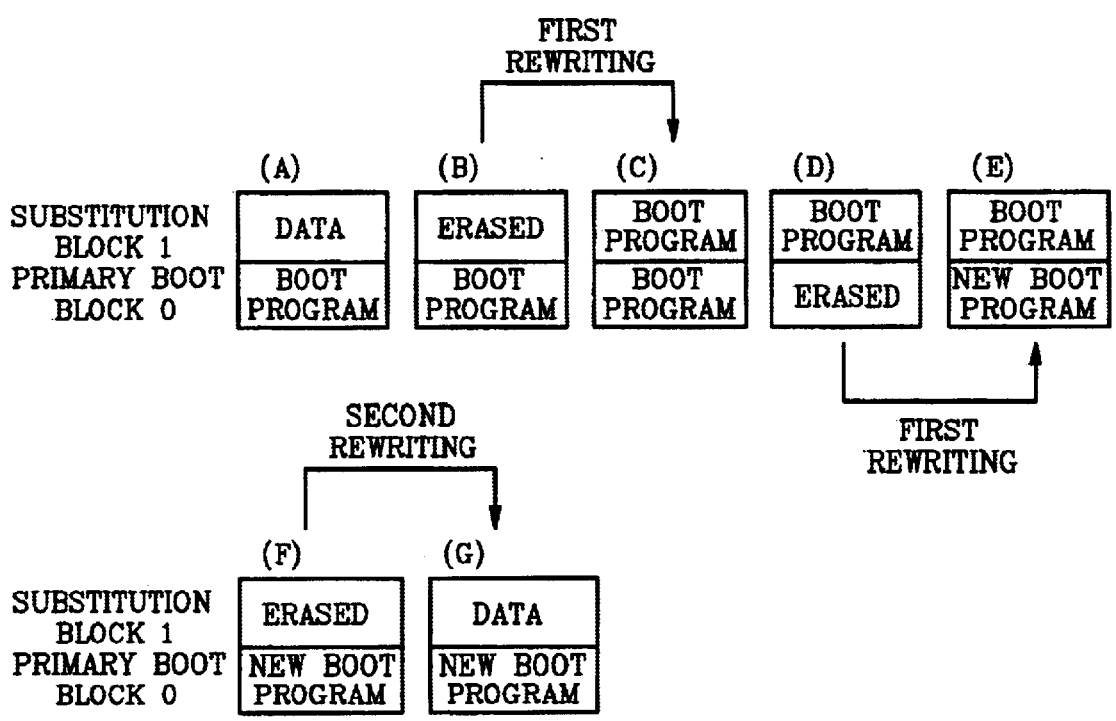
FIG. 2 is a flow chart showing how a primary boot block and a substitution block are rewritten in the conventional method illustrated in FIG. 1.

In the conventional method having been explained with reference to FIGS. 1 and 2, it is necessary to copy a boot program stored in the primary boot block 0 into the substitution block 1, as illustrated in FIG. 2-(C) and it is also necessary to carry out an erasion/writing operation twice to the substitution block 1 in order to erase the boot program copied into the substitution block 1 and use the substitution block 1 as an area for storing data therein, as illustrated in FIGS. 2-(F) and 2-(G).

In accordance with the above-mentioned method, it is no longer necessary to copy a boot program stored in a primary boot block (the first flash memory block (0) 26) into the second flash memory block (1) 28 acting as a substitution block, unlike the conventional method. It is possible to write a new boot program directly into the second flash memory block (1) 28 acting as a substitution block, in place of copying a boot program to the second flash memory block (1) 28. Hence, an erasion/writing operation of a boot program to the second flash memory block (1) 28 acting as a substitution block is carried out only once, as illustrated in FIG. 5-(C), whereas the same operation had to be carried out twice in the conventional method.

As mentioned above, the method in accordance with the embodiment makes it possible to reduce the number of erasion/writing of a boot program to the second flash memory block (1) 28 acting as a substitution block, ensuring reduction in stress to be exerted on a flash memory of the second flash memory block (1) 28, and hence, lengthening a lifetime of the flash memory.

Though the program rewriting operation is carried out among the two flash memory blocks in the above-mentioned embodiment, the method in accordance the present invention can be applied to a flash memory including three or more flash memory blocks. A flash memory including the greater number of flash memory blocks would have a longer lifetime.

The method of rewriting a boot program is explained in connection with a flash memory in the above-mentioned embodiment. However, it should be noted that the present invention is not to be limited to a flash memory, but can be applied to any device having a necessity of rewriting a program.

For instance, there may be used other ROMs such as EEPROM as well as a flash memory.

The flash microcomputer in accordance with the above-mentioned embodiment is designed to include the first to fourth storage areas 27, 29, 31 and 33 for storing boot program data therein, in the flash memory 20 which storage areas 27, 29, 31 and 33 are separate from user areas. However, the storage areas 27, 29, 31 and 33 may be arranged in user areas. It is not always necessary to prepare the first to fourth storage areas 27, 29, 31 and 33 separately from user areas.

The first to fourth storage areas 27, 29, 31 and 33 may be designed to have a greater capacity in order to store other data therein. For instance, the storage areas 27, 29, 31 and 33 may be used as areas associated with the first to fourth flash memory blocks 26 to 32 for controlling the number of rewriting a program.

The method of rewriting a program having been mentioned so far may be accomplished as a program including various commands, and be presented through a recording medium readable by a computer.

Figure 13:
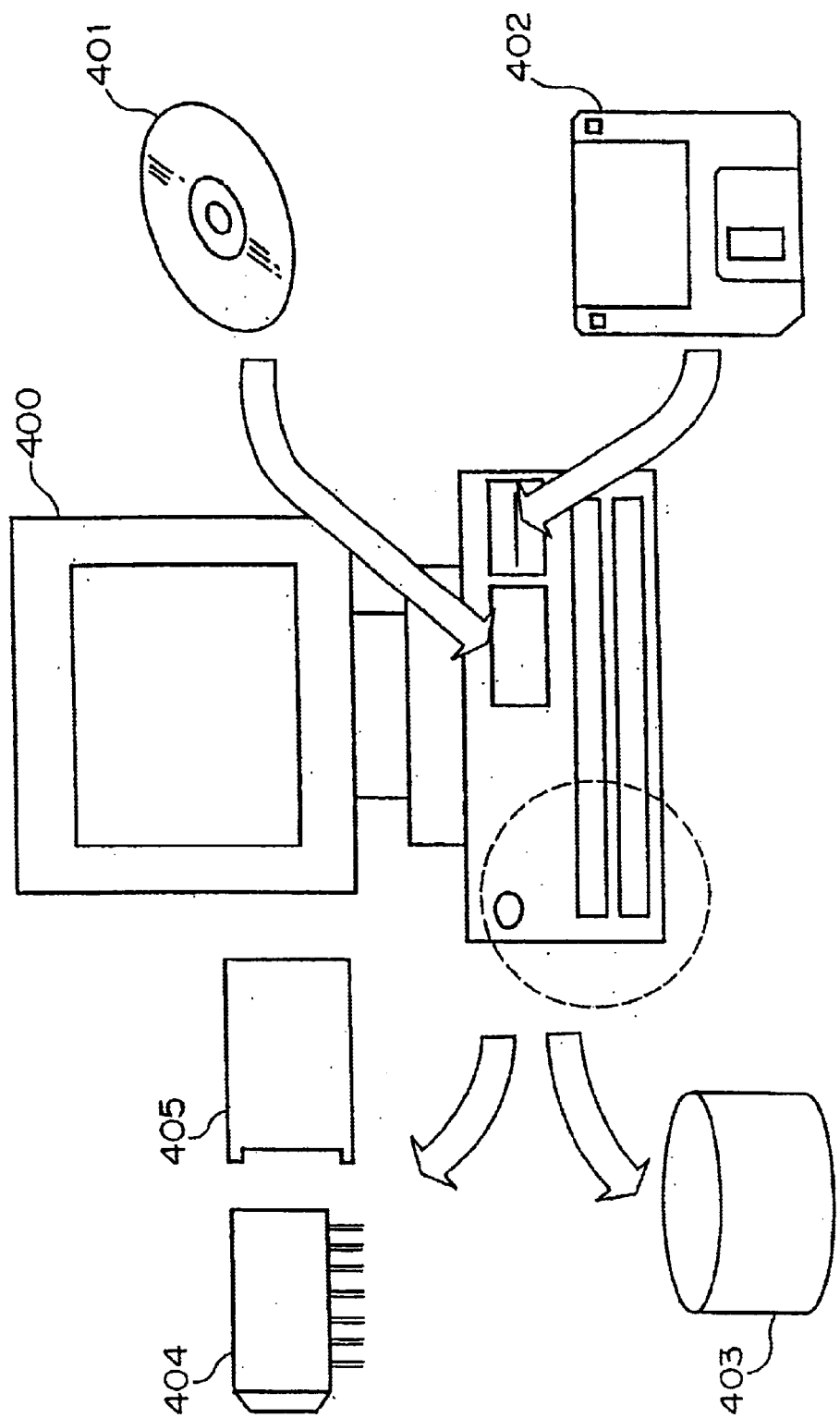
FIG. 13 illustrates examples of recording mediums in which a program for rewriting a program in a flash microcomputer is to be stored.

In the specification, the term "recording medium" means any medium which can record data therein. Examples of a recording medium are illustrated in FIG. 13.

The term "recording medium" includes, for instance, a disk-shaped recorder 401 such as CD-ROM (Compact Disk-ROM) or PD, a magnetic tape, MO (Magneto Optical Disk), DVD-ROM (Digital Video Disk-Read Only Memory), DVD-RAM (Digital Video Disk-Random Access Memory), a floppy disk 402, a memory chip 404 such as RAM (Random Access Memory) or ROM (Read Only Memory), EPROM (Erasable Programmable Read Only Memory), EEPROM (Electrically Erasable Programmable Read Only Memory), smart media (Registered Trade Mark), a flush memory, a rewritable card-type ROM 405 such as a compact flush card, a hard disk 403, and any other suitable means for storing a program therein.

A recording medium storing a program for accomplishing the above-mentioned apparatus may be accomplished by programming functions of the above-mentioned apparatuses with a programming language readable by a computer, and recording the program in a recording medium such as mentioned above.

A hard disc equipped in a server may be employed as a recording medium. It is also possible to accomplish the recording medium in accordance with the present invention by storing the above-mentioned computer program in such a recording medium as mentioned above, and reading the computer program by other computers through a network.

As a computer 400, there may be used a personal computer, a desk-top type computer, a note-book type computer, a mobile computer, a lap-top type computer, a pocket computer, a server computer, a client computer, a workstation, a host computer, a commercially available computer, and electronic exchanger, for instance.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2000-19997 filed on Jan. 28, 2000 including specification, claims, drawings and summary is incorporated herein by reference in its entirety.

What is claimed is:

1. A method of writing a new boot program into a memory device having first and second memory blocks into which a boot program can be written and from which a boot program can be read, the first memory block being identified as a primary boot block storing an existing boot program and the second memory block being a secondary block storing other information, the method comprising the steps of:

erasing the second memory block;

writing the new boot program into the erased second memory block;

after writing the new boot program, changing an identity of the primary boot block from the first memory block to the second memory block;

erasing the first memory block;

storing other information in the first memory block;

retaining the identity of the primary boot block as the second memory block until a further new boot program is written into the memory device; and wherein the step changing an identity of the primary boot block comprises the steps of storing in a storage area associated with the first memory block first program data indicating that the first memory block stores an existing boot program, storing in a storage area associated with the second memory block second program data different from the first program data indicating that the second memory block stores a new boot program, and exchanging addresses of the second memory block and the first memory block.

2. The method as set forth in claim 1, further comprising the step of judging that the new boot program was not properly written when both the first and second memory blocks store a boot program.

3. The method as set forth in claim 1, further comprising the step of judging that the new boot program was not properly written when data in storage areas associated with both the first and second memory blocks indicates that both the first and second memory blocks store a boot program.

4. The method as set forth in claim 1, wherein the memory device includes three or more memory blocks, and the first and second memory blocks are selected from among the three or more memory blocks.

5. The method as set forth in claim 1, wherein the memory device is a flash memory.

6. The method as set forth in claim 1, wherein the memory device is a read only memory (ROM).

7. A recording medium readable by a computer and storing a program for causing a computer to perform a method of writing a new boot program into a memory device having first and second memory blocks into which a boot program can be written and from a boot program can be read, the first memory block being identified as a primary boot block storing an existing boot program and the second memory block being a secondary block storing other information, the method comprising the steps of:

erasing the second memory block;

writing the new boot program into the erased second memory block;

after writing the new boot program, changing an identity of the primary boot block from the first memory block to the second memory block;

erasing the first memory block;

storing other information in the first memory block; and retaining the identity of the primary boot block as the second memory block until a further new boot program is written into the memory device.

8. The recording medium of claim 7, further comprising the step of judging that the new boot program was not properly written when both the first and second memory blocks store a boot program.

9. The recording medium of claim 7, further comprising the step of judging that the new boot program was not properly written when data in storage areas associated with both the first and second memory blocks indicates that both the first and second memory blocks store a boot program.

10. The recording medium of claim 7, wherein the memory device includes three or more memory blocks, and the first and second memory blocks are selected from among the three or more memory blocks.

11. The recording medium of claim 7, wherein the memory device is a flash memory.

12. The recording medium of claim 7, wherein the memory device is a read only memory (ROM).

* * * * *